United States Patent [19]

Fairchok et al.

[11] Patent Number: 4,582,877
[45] Date of Patent: Apr. 15, 1986

[54] TRANSAMIDATED POLY-2-OXAZOLINE COMPOSITIONS USEFUL AS WETTING AGENTS FOR POLYMER AND ABSORBENTS FOR POLAR MATERIALS

[75] Inventors: William J. Fairchok, Saginaw; Bruce P. Thill; Ralph E. Friedrich, both of Midland; Mark J. McKinley, Linwood, all of Mich.

[73] Assignee: The Dow Chemical Company, Midland, Mich.

[21] Appl. No.: 635,038

[22] Filed: Jul. 27, 1984

[51] Int. Cl.$^4$ .................... C08L 79/00; C08L 23/12
[52] U.S. Cl. .................... 525/186; 525/411; 525/417; 524/612
[58] Field of Search .............. 525/411, 417, 186; 528/403

[56] References Cited

U.S. PATENT DOCUMENTS

| | | | |
|---|---|---|---|
| 3,470,267 | 9/1969 | Litt et al. | 525/186 |
| 4,186,191 | 1/1980 | Chamberlin et al. | 528/403 |
| 4,474,928 | 10/1984 | Hoenig et al. | 525/186 |
| 4,485,220 | 11/1984 | Hefner et al. | 525/411 |
| 4,490,494 | 12/1984 | Shropshire | 525/186 |

FOREIGN PATENT DOCUMENTS

| | | | |
|---|---|---|---|
| 0136844 | 10/1981 | Japan | 525/411 |
| 0108132 | 7/1982 | Japan | 525/417 |

*Primary Examiner*—Wilbert J. Briggs, Sr.
*Attorney, Agent, or Firm*—D. L. Corneglio

[57] ABSTRACT

A polymeric composition comprising a poly-2-oxazoline reacted by transamidation with a carboxylic acid, anhydride, salts of a carboxylic acid or combination thereof which can be blended with another polymeric composition to form a water wettable blend. In another aspect, the poly-2-oxazoline is crosslinked with a polybasic carboxylic acid by transamidation. The crosslinked polymeric composition is useful as an absorbent for polar materials.

13 Claims, No Drawings

TRANSAMIDATED POLY-2-OXAZOLINE COMPOSITIONS USEFUL AS WETTING AGENTS FOR POLYMER AND ABSORBENTS FOR POLAR MATERIALS

BACKGROUND OF THE INVENTION

This invention relates to polymeric compositions derived from the transamidation of poly-2-oxazoline with carboxylic acids. Optionally, anhydrides or salts of carboxylic acids can be employed as substitutes or in conjunction with the carboxylic acids. These compositions have an affinity for polar materials and, therefore, are useful in areas requiring this characteristic.

The strong tendency of the subject polymeric compositions to absorb or bind polar materials means they can be compounded with normally nonwettable polymers to make them water wettable. Further, the subject polymers can be made insoluble by crosslinking and, therefore, can be employed as an absorbent for polar materials.

SUMMARY OF THE INVENTION

The present invention is a polymeric composition comprising (a) a polymer of poly-2-oxazoline and (b) a carboxylic acid, anhydride, salt of a carboxylic acid or combination thereof where the (b) component has reacted by transamidation with the poly-2-oxazoline. In a preferred embodiment, the polymeric composition is poly-2-ethyloxazoline and a carboxylic acid. The subject polymeric composition can be blended with another polymeric composition to form a water wettable blend.

In another aspect, the present invention is a polymeric composition comprising (a) a polymer of poly-2-oxazoline and (b) a polybasic carboxylic acid which has reacted by transamidation with the poly-2-oxazoline to crosslink the poly-2-oxazoline. Preferably, the crosslinked polymeric composition is poly-2-ethyloxazoline and ethyleneaminediaminetetraacetic acid. The subject crosslinked polymeric composition is useful as an absorbent for polar materials. In particular, the crosslinked polymeric composition swells into a gel-like mass in the presence of polar materials to entrap them.

DETAILED DESCRIPTION OF THE INVENTION

Generally, the polymeric composition of the subject invention entails the transamidation reaction of poly-2-oxazoline with carboxylic acid. The particular characteristics of the composition are dependent on the degree of conversion and carboxylic acid employed. Generally the transamidation reaction, Reaction A, involving poly-2-oxazoline with carboxylic acid can be structurally depicted as follows:

Reaction A

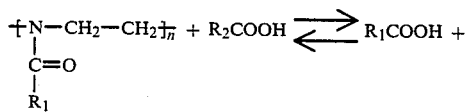

-continued
Reaction A

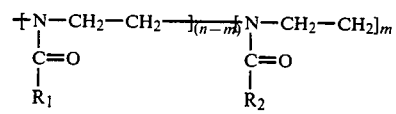

Reaction A depicts partial transamidation wherein a portion of the $R_1$ groups present on the poly-2-oxazoline have been replaced by the $R_2$ groups from the carboxylic acid. $R_1$ is typically hydrogen, phenyl, or alkyl having up to 18 carbon atoms or an inertly-substituted derivative thereof. $R_2$ is typically hydrogen, phenyl, or alkyl having up to 22 carbon atoms or an inertly-substituted derivative thereof. Optionally a majority of the $R_1$ groups present on the poly-2-oxazoline can be replaced by the $R_2$ groups. The more preferred reaction involves the transamidation of poly-2-oxazoline with a polybasic carboxylic acid such as di-, tri- or tetracarboxylic acid. A reaction with the polybasic carboxylic acid provides the advantage of crosslinking the poly-2-oxazoline which in turn provides an insoluble characteristic to the polymeric composition. Coupled with the affinity of the polymeric composition for polar materials, the crosslinked composition will form a gel in the presence of polar materials to thus behave as an absorbant. The reaction of poly-2-oxazoline with polybasic carboxylic acids, Reaction B, can be structurally depicted as follows where "Z" represents

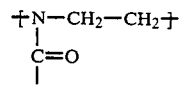

Reaction B

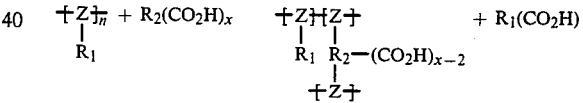

Reaction B indicates partial transamidation, x-2, where all the carboxyl groups, x, have not reacted. Optionally all the carboxyl groups present on the polybasic carboxylic acid can react. $R_1$ is typically hydrogen, phenyl, or alkyl having up to 18 carbon atoms or an inertly-substituted derivative thereof. $R_2$ is typically hydrogen, phenyl, or alkyl having up to 22 carbon atoms or an inertly-substituted derivative thereof.

As can be seen from the Reactions A and B, the major components which make up the subject polymeric composition are poly-2-oxazoline and a carboxylic acid. However, it is understood that the poly-2-oxazoline need not be a homo-polymer but may be a portion of a copolymer.

The other elements of the copolymer may comprise polyolefins, polyamines, and polyethers. Examples of such copolymers are poly[styrene-β-methyloxazoline], S. L. N. Seung and R. N. Young, *J. Polymer Sci., Polymer letters,* 17, 233 (1979); poly[styreneoxide-β-methyloxazoline], IBID, 18, 89 (1980); poly[isobutylene-β-methyloxazoline], V. Percec et al., *Polymer Bull.,* 8, 25 (1982).

The term poly-2-oxazoline as used herein is meant to define compounds of n randomly-joined units (I, II) and are readily prepared by the ring-opening polymerization of 2-oxazolines or like compounds (III).

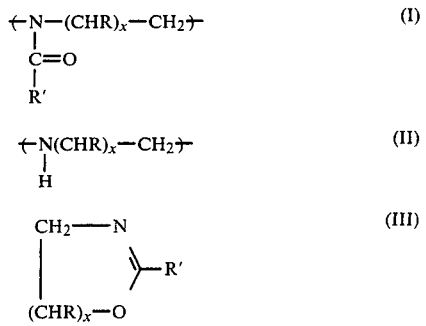

The substituents and subscripts are hereinafter defined. The ring-opening polymerization of 2-oxazoline monomers is generally conducted in the presence of a cationic polymerization catalyst at a reaction temperature of about 0° C.–200° C. Typical catalysts include strong mineral acids, organic sulfonic acids and their esters, acidic salts such as ammonium sulfate, Lewis acids such as aluminum trichloride, tin tetrachloride, boron trifluoride and organic diazoniumfluoroborates, dialkyl sulfates and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. 1,206,585; Jones and Roth, U.S. Pat. No. 3,640,909; and Litt et al., U.S. Pat. No. 3,483,141.

The pre-hydrolyzed polymers thereby obtained are linear, N-acylated polyethyleneimines or polytrimethyleneimines having a molecular structure consisting essentially of repeating units (I). These polymers can be used as such or the partially hydrolyzed form. These polymers are easily hydrolyzed (deacylated) by contact with a strong acid, such as HCl, followed by contact with a base, such as NaOH. This process is further described by K. M. Kem, *J. Polymer Science*, 17, 1977 (1979). The partially hydrolyzed polyoxazolines, have a molecular structure consisting essentially of the randomly-joined units (I) and (II), illustratively depicted as:

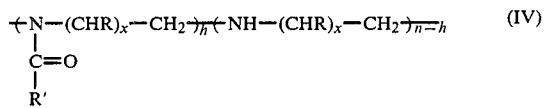

wherein: n is the total number of units or degree of polymerization; h is the number of acylated units; and n-h is the number of hydrolyzed units. In the present invention, n-h is within the range of from zero to about 50 percent of n. In the above formulae, R is typically hydrogen or $C_1$–$C_3$ alkyl; R' is typically hydrogen, phenyl or an alkyl group having up to about 18 carbon atoms or an inertly-substituted derivative thereof; and x is 1 or 2. As used herein, "2-oxazoline" includes both poly-2-oxazoline monomers, i.e., x is 1 and 2-dihydrooxazine monomers, i.e., x is 2, and "poly-2-oxazoline" includes both poly-2-oxazoline polymers and poly-2-dihydrooxazine polymers. By such terms as "inertly-substituted" is meant that the substituents do not preclude the polymerization of the 2-oxazoline monomers. Illustrative inert substituents include halogen, alkenyl hydrocarbons, alkoxy, ester, etc. Exemplary R substituents include hydrogen, methyl, ethyl and proply and exemplary R' substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc.

Typically, the poly-2-oxazoline has a molecular weight within the range of 1,000 to 1,000,000. In the present invention, it is preferable to use a poly-2-oxazoline having a molecular weight within the range of about 100,000 to about 600,000.

With respect to the second major component of the subject transamidation reaction the term carboxylic acids is meant to define compounds represented by the formula $R(COOH)_x$ where R is an alkyl, aryl, alkyl or aryl substituted group and x is 1 or more. Preferably x is 2 to 4, meaning polybasic carboxylic acids which are capable of crosslinking the poly-2-oxazoline. Examples of preferred carboxylic acids are stearic acid, benzoic acid, adipic acid, and ethylenediaminetetraacetic acid (EDTA).

Optionally anhydrides and salts of carboxylic acids can be employed for or in conjunction with the carboxylic acids to perform the transamidation function. Just as with the carboxylic acids, multi-functional anhydrides and salts of carboxylic acids are preferred in order to crosslink the poly-2-oxazoline. Examples of anhydrides which can be employed are maleic anhydride, succinic anhydride, pathalic anhydride and the like. Salts of carboxylic acids can be any of those generally described under carboxylic acids.

Generally the subject polymeric composition can be prepared by intimately blending the two components (poly-2-oxazoline and carboxylic acid, anhydride, or acid salt) such that transamidation occurs. This blending can be carried out by various means such as in a mixer, Brabender or on a mill.

One means for identifying when the transamidation reaction has occurred such that the poly-2-oxazoline has become crosslinked is by monitoring the torque of the blending mechanism employed. Generally it has been found that there is an increase in torque as the transamidation reaction proceeds.

The temperature at which the reaction process proceeds is not particularly critical so long as the stability limitations of the components are not exceeded; however, for ease of blending temperatures over 180° C. are recommended. Preferably the process temperature is from 200° C. to 250° C. to blend the components in a time effective manner. Naturally it is understood that the time for blending is dependent on the volume of product to be prepared, the blending means employed and the particular temperature chosen. The end-point for reacting the components is identifiable by torque measurements as aforementioned.

The subject polymeric composition comprises poly-2-oxazoline and sufficient carboxylic acid to transamidate and/or crosslink the poly-2-oxazoline to any desired degree. Generally, therefore, the polymeric composition of the invention comprises from about 70 to about 99 percent by weight poly-2-oxazoline, and from about 1 to about 30 percent by weight carboxylic acid. The preferred operative range is from about 90 to about 97.5 percent by weight poly-2-oxazoline and from about 2.5 to about 10 percent by weight carboxylic acid. It is understood the anhydrides, or salts of carboxylic acids as explained above can optionally be employed for or in conjunction with the carboxylic acid component.

Applications for the polymeric composition are varied but are generally related to the affinity the compositions have for polar materials. For example, compositions prepared from poly-2-ethyloxazoline and adipic acid or zinc stearate have been found to be useful as wetting agents for polymers. What is meant by wetting agents for polymers is that non-wettable polymers such as polypropylene can be made water wettable by blending the subject composition into the polypropylene. Thus, the polymeric composition of the invention can be blended with a normally non-wettable polymer to form a water wettable blend. Water wettable is defined as the characteristic of having water droplets cling to the molded flat surface of the polymer without readily sliding off as the surface angle is changed. Furthermore, the reaction of carboxylic acids with the poly-2-oxazolines has been found to improve the compatibility of poly-2-oxazoline with other polymers such as polypropylene. This was demonstrated when unmodified poly-2-ethyloxazoline tended to become brittle and wash away from the surface of molded polypropylene. Meanwhile, 70 percent poly-2-ethyloxazoline reacted with 30 percent stearic acid was found to be flexible with reduced water solubility.

In another aspect the subject polymeric composition, when formed from multibasic carboxylic acids is an absorbent for polar materials by swelling into a gel-like mass in their presence. The gel characteristic indicates the presence of crosslinking. Preferably, the subject polymeric composition can absorb several times its weight of a polar liquid and more than 15 times its weight of water. The polymeric composition of the invention is therefore useful as an absorbent for organic materials. More particularly the polymeric composition can be employed to remove polar materials from non-polar feedstreams such as in shut-off filters for fuels and hydraulic fluids. One method can comprise employing the subject polymeric composition in conjunction with a filter medium to separate water and polar organics from a non-polar hydrocarbon stream. In yet another aspect the subject polymeric composition can be dispersed in an absorbent medium, such as paper or other fibers, to assist in the absorbance of water or other polar material.

The following examples are provided to illustrate the preparation of the subject polymeric composition.

EXAMPLE I

A brabender mixer was heated to 225° C. and 47.5 grams (g) of poly-2-ethyloxazoline (MW 200,000) (hereinafter referred to as PEOx) was added. After allowing the PEOx to mix for ten minutes 2.5 g of adipic acid was added. Initially there was a decrease in torque which indicated plasticization of the PEOx; however, after an additional twenty minutes mixing a rapid increase in torque was noted which indicated that the transamidation reaction had occurred. A further fifty minutes of mixing was completed and the product was removed and cooled.

A 2 g sample of the product was added to 15 g of water in a closed bottle and placed on a bottle roller overnight. Upon inspection the sample had swelled into a gel-like mass. Portions of the gel were placed in 1N NaOH and 1N HCl solutions overnight and remained unchanged in appearance. This indicated that the PEOx was crosslinked by the adipic acid.

EXAMPLE II

A product consisting of 90 weight percent PEOx and 10 weight percent stearic acid was prepared in a mixer at 225° C. by blending the components for fifty minutes. The product was collected, cooled and ground into fine particles. The fine particles were then melt blended into polypropylene at 200° C. to form a modified polypropylene blend consisting of 10 weight percent PEOx/stearic acid product and 90 weight percent polypropylene (Hercules Profax ® 6331).

The modified polypropylene blend was finely ground and injection molded into a disc. The contact angle with water of the molded disc was then measured on a goniometer which showed the modified polypropylene blend to be water wettable.

EXAMPLE III

A modified polypropylene blend was prepared as in Example II except that zinc stearate was employed instead of stearic acid. The contact angle with water for the molded disc was measured with a goniometer and showed the modified polypropylene blend to be water wettable.

EXAMPLE IV

A brabender mixer was heated to 220° C. and 45 g of PEOx was added. After five minutes 5 g of ethylenediaminetetraacetic acid (EDTA) was added to the PEOx. The mixture was blended at 50 rpm until the torque reached 2500 g-cm. The blended polymeric composition was collected and allowed to cool. The resulting product was brittle at room temperature and was ground on a mill into a small particle size.

To demonstrate the absorbent properties of the PEOx/EDTA product the ground product was placed in polar liquids and the grams of polar liquid absorbed per gram of PEOx/EDTA product was measured. The results showed that a 1 g sample of the PEOx/EDTA absorbed, individually, 26 g of methanol; 29 g of 95% ethanol/5% water; 11 g of methylethylketone; 14 g of acetone; 36 g of deionizer water; 31 g of a 1% NaCl solution; 3 g of toluene; and 28 g of a 1N $H_2SO_4$ solution.

In view of the foregoing, the subject product can be advantageously employed in filter mediums used in non-polar hydrocarbon feed streams. In particular a polymeric composition such as PEOx/EDTA may be dispersed in a fiberglass filter medium as is generally described in U.S. Pat. No. 4,242,286 which discloses a filter mechanism construction.

What is claimed is:

1. A process for preparing a water-wettable polymer by blending a non-wetting polymer with a polymeric composition comprising:
   (a) a poly-2-oxazoline; and
   (b) a carboxylic acid, anhydride, salt of a carboxylic acid, or a combination thereof;
wherein said (b) has reacted with said poly-2-oxazoline by transamidation.

2. The process of claim 1 wherein said poly-2-oxazoline is present as a copolymer.

3. The process of claim 1 wherein said poly-2-oxazoline is poly-2-ethyloxazoline.

4. The process of claim 1 wherein said carboxylic acid is polybasic.

5. The process of claim 4 wherein said polybasic carboxylic acid has reacted by transamidation with said poly-2-oxazoline to crosslink said poly-2-oxazoline.

6. The process of claim 4 where said polybasic carboxylic acid is ethyleneaminediaminetetraacetic acid.

7. The process of claim 1 where said non-wetting polymer is polypropylene.

8. A water-wettable polymer prepared by the process of claim 1.

9. The water-wettable polymer of claim 8 where said poly-2-oxazoline is present as a copolymer.

10. The water-wettable polymer of claim 8 where said poly-2-oxazoline is poly-2-ethyloxazoline.

11. The water-wettable polymer of claim 8 where said carboxylic acid is polybasic.

12. The water-wettable polymer of claim 1 where said polybasic carboxylic acid is ethyleneaminediaminetetraacetic acid 13. The water-wettable polymer of claim 8 wherein said non-wetting polymer is polypropylene.

* * * * *